P. A. MYERS.
POWER DRIVEN PUMP.
APPLICATION FILED AUG. 9, 1917.
1,368,449.
Patented Feb. 15, 1921.
2 SHEETS—SHEET 1.
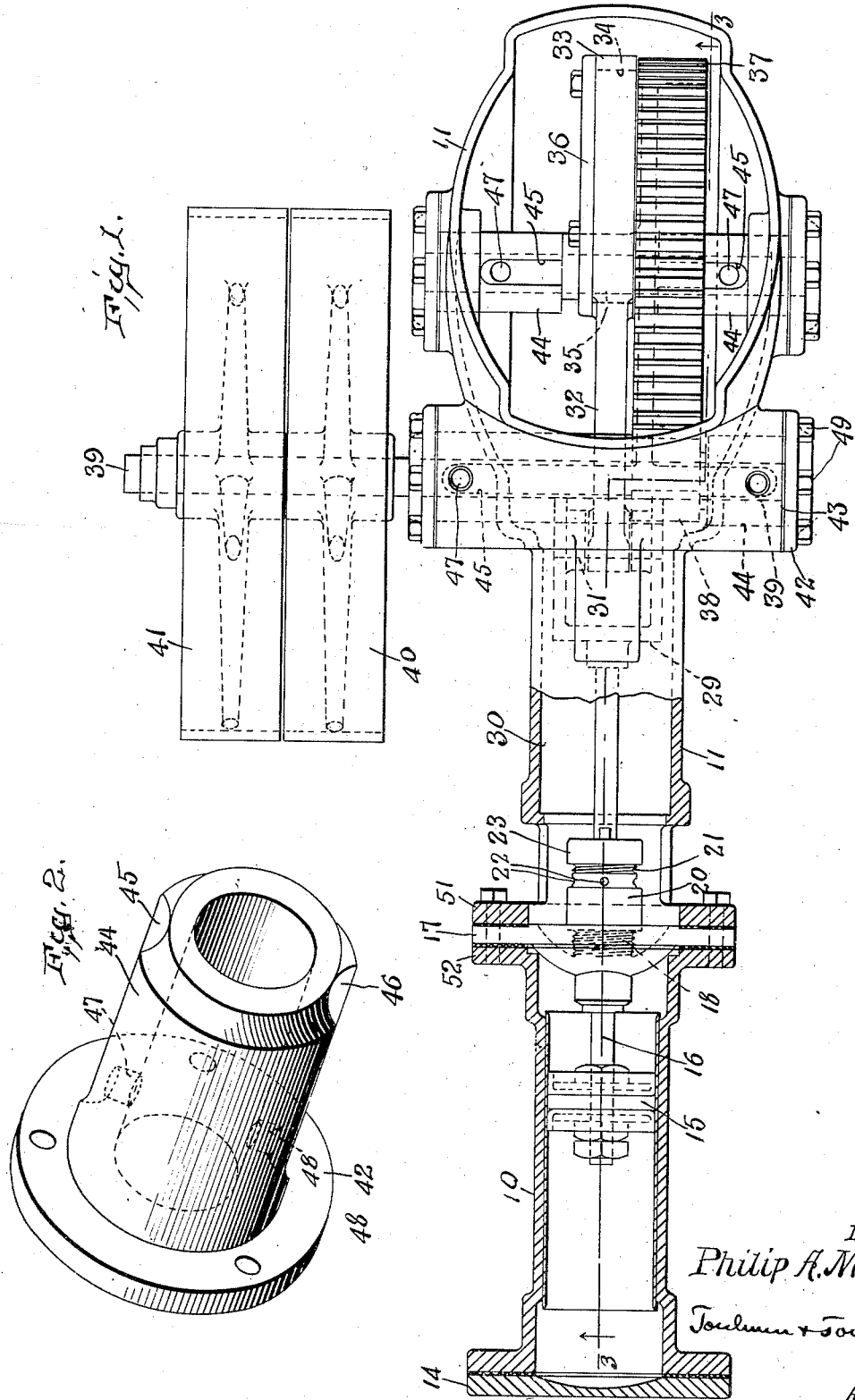
Inventor
Philip A. Myers,
Toulmin + Toulmin,
Attorneys

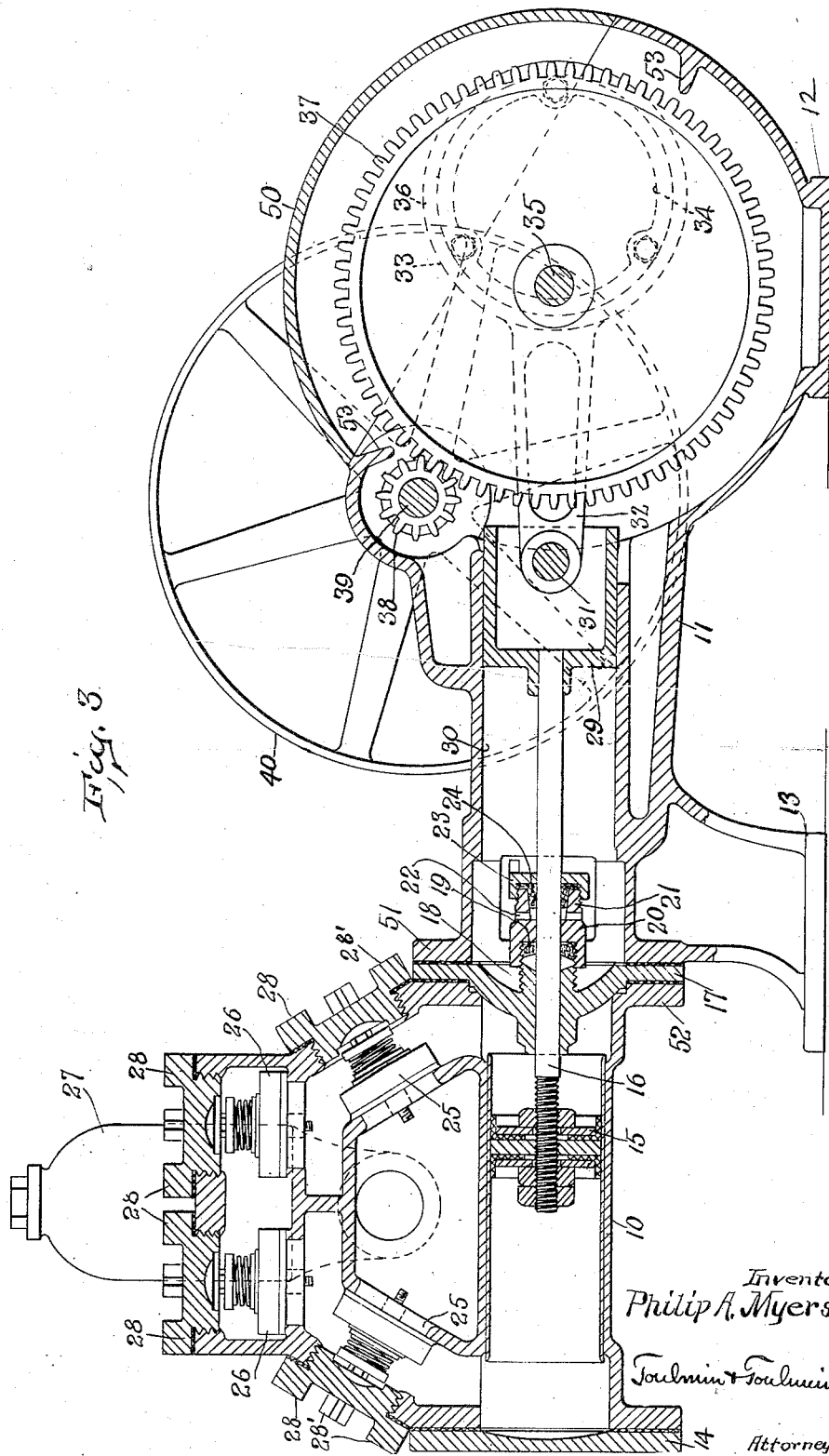

UNITED STATES PATENT OFFICE.

PHILIP A. MYERS, OF ASHLAND, OHIO, ASSIGNOR TO F. E. MYERS AND BROTHER, A COPARTNERSHIP CONSISTING OF FRANCIS E. MYERS AND PHILIP A. MYERS, OF ASHLAND, OHIO.

POWER-DRIVEN PUMP.

1,368,449.

Specification of Letters Patent.   Patented Feb. 15, 1921.

Application filed August 9, 1917. Serial No. 185,248.

*To all whom it may concern:*

Be it known that I, PHILIP A. MYERS, a citizen of the United States, residing at Ashland, in the county of Ashland and State of Ohio, have invented certain new and useful Improvements in Power-Driven Pumps, of which the following is a specification, reference being had therein to the accompanying drawing.

This invention relates to power driven pumps and has among its main objects to provide a device of that type having an improved construction in several particulars. Among the main features of improvement are the provision of reversible and replaceable boxings or bearings for the shafts supporting the driving gearing by which the parts may readily be replaced if worn and by which the driving connections may be reversed so as to be on the opposite side of the gear casing. This is of advantage in that it provides for conditions under which the driving pulley or driving gear of the pump must be on either side of the gearing without change of the parts.

An additional object is to provide a construction wherein the casing supporting the gearing is compelled to have an accurate alinement with the cross head and the piston and piston rod of the pump. To this end a cast casing is provided in which the driving or actuating mechanism and the cross head of the pump are carried and to which the pump cylinder may be rigidly fastened.

An additional object is to provide an improved casing for the gearing of the pump whereby the casing may act as an oil reservoir and thus the pump need oiling at very long intervals. The driving elements or some of them dip into the oil in the casing and by the movement of the parts the oil is carried to every part of the gearing, thus maintaining thorough lubrication. This movement of the oil is aided by baffle plates integral with or attached to the side of the casing.

As a further improvement the construction provides an improved device for preventing water or other liquid being pumped from passing into the casing and mingling with the oil therein. This is important as the mixture of such liquid with the oil prevents the oil from keeping the gearing well lubricated.

In the accompanying drawings,

Figure 1 is a plan view of the pump and its operating mechanism, part of the casing for the operating mechanism being broken away and the pump cylinder being shown in section;

Fig. 2 is a detail perspective of one of the removable bearings shown in Fig. 1; and Fig. 3 is a vertical longitudinal section on the line 3—3 of Fig. 1.

The drawings show a double action suction pump but it will be understood that this is merely for illustration and that the invention is applicable to pumps of other styles, such for example, as the single action pump or the force pump. The pump cylinder is bolted fast to the gear casing and kept in line thereby. The gear casing may be cast integrally and carries the cross head for the pump and the gearing driving it. All these parts are, therefore, kept rigidly in line and the casing provides an oil reservoir serving to lubricate the parts. The piston rod is surrounded outside the pump cylinder with means to keep water or other pumped liquid from entering the gear casing by an independent unit mounted on a flange to which the pump cylinder is fast.

Referring now to the drawings it will be seen that there are two principal castings employed including the casting 10 for the pump cylinder and the casting 11 supporting the actuating devices for the pump. The gear casing 11 may be provided with portions 12 and 13 which rest on any desired foundation and support the entire mechanism. It will be seen that the pump cylinder 10 and the valve mechanism of the pump is not supported from the foundation referred to but is carried entirely by the casting 11.

The pump cylinder 10 is shown as provided with an end 14 which may be fastened to the pump cylinder in any desired way and the cylinder carries a piston 15 mounted on a piston rod 16. The end of the cylinder nearest the actuating gearing comprises a circular flange 17 through which the piston rod moves and which may be provided with a stuffing box 18 and packing 19. A cap 20 serves to maintain the packing 19 in place and this cap is provided with an extension 21 having holes 22 therethrough, a cap 23 being screw-threaded on the extension 21.

Between the cap 23 and the extension 21 is carried an inverted bucket or wiper 24 which may be of leather. This wiper 24 serves to prevent any liquid which may have passed through the stuffing box from traveling along the piston rod and finally getting into the oil supply in the casing 11. This function is accomplished because the openings 22 to the air prevent the pump pressure from being transmitted past the bucket or wiper 24. As this wiper is under merely atmospheric pressure the pumped liquid cannot pass by it along the piston rod 16.

The valve mechanism of the pump need not be particularly described. It includes suction valves 25 and discharge valves 26. The operation of these valves will be obvious and as is customary air chambers 27 may be provided on both the suction and the discharge side of the pump if desired. Caps 28 are provided over the suction and discharge valves so as to permit access thereto, these caps being screw-threaded into the casting and provided, if desired, with projections 28 by which the caps may be turned by a wrench.

The piston rod 16 is connected to a cross head 29 which rides in the cylindrical portion 30 of the casting 11. A pin 31 mounted in the cross head supports an eccentric rod 32 which is shown as integral with an eccentric strap 33. The eccentric disk 34 is mounted on a shaft 35 and an annular plate 36 is fastened as by bolts to the eccentric disk 34 and serves to keep the eccentric strap thereon. Loose on the shaft 35 and fast to the eccentric disk 34 is a large gear 37 and this gear is driven by a pinion 38 carried by a pinion shaft 39. Mounted on the pinion shaft outside the casing may be tight and loose driving pulleys 40 and 41, though it will be understood that if desired these may be replaced by a large gear so that the pump may be driven by an electric motor.

The bearings for the pinion shaft 39 and the driven shaft 35 are shown in Fig. 1 and one of them is shown separately in Fig. 2. These bearings comprise flanges 42 which are circular and are adapted to be fastened over openings 43 in the casing 11 and to these flanges 42 are integrally connected cylindrical portions 44 which pass through the openings 43 of the casing and in which the shafts 35 and 39 are carried. As shown in Fig. 2, the cylindrical portions 44 are provided with upper and lower grooves 45 and 46, these grooves being parallel to the axis of the cylindrical portion and serving to conduct the oil. From the upper groove near the center thereof a hole 47 is provided passing through the cylindrical portion 44, whereby oil may reach the shaft contained therein. Also an opening 48 passes from the lower groove 46 to the inside of the cylindrical portion, permitting the exit of oil from the shaft. From Fig. 1 it will be seen that both the pinion shaft 39 and the driven shaft 35 are provided with such bearings as are shown in Fig. 2. These bearings may be readily removed from the casing and similar bearings substituted therefor or if they become slightly worn from use may be babbitted in the customary way to take up the wear.

It will be seen that if it is desired to move the driving pulleys 40 and 41 to the other side of the gear casing this may readily be done by withdrawing the screws or bolts 49 which retain the flanges 42 of the bearings against the casing 11 and then withdrawing the bearings separately and bodily from the casing. The shaft may then be taken entirely out of the device and inserted in the other side of the casing and the bearings also inserted from the opposite side of the casing, the cylindrical portions 44 passing through the openings therein.

The openings 43 in the casing are all bored in proper alinement and to an accurate size, and the cylindrical portions 44 are turned accurately the same size, and the shaft bearing is bored in true relation to the outside diameter of the bearing which registers with the opening in the casing. It is intended by this construction that the thrust of the shaft be carried by this close fit of the outer diameter of the cylindrical portion and the bore of the casing and that the three bolts that hold the cylindrical portions in position are only to perform that function, but are not expected to resist the thrust of the shaft.

The casing 11 is provided with a hood 50 which fits tightly enough on the casing to prevent oil from passing out and yet is readily removed from the casing. The hood provides an opening large enough to remove the large gear 37 therethrough and if it is desired to remove this gear for repairs or replacement the two bearings at the opposite ends of the shaft 35 may be removed as before described, whereupon the shaft 35 may be withdrawn through the casing openings and then the large gear 37 and the eccentric disk 34 may be removed through the hood opening of the casing with the cross head.

It will be seen that the provision of an integral casing 11 serving as a support for the driving gearing and for the cross head serves to keep the cross head rigidly in line with the gearing. The casing 11 ends in a circular flange 51 and the flange 17 supporting the stuffing box and the wiper 24 with its carrying parts is bolted directly to the flange 51, as is the flange 52 in which the pump cylinder ends. One set of bolts may pass through all three flanges, thus keeping them rigidly in line and making a construction where the stuffing box and bucket and the carrying parts therefor are an entirely independent unit. The provision of the flanges 52, 17 and 51 provides for keeping the pump cylinder and therefore the piston rod 16 rigidly in line with the cross head and thus prevents friction and wear of the piston and piston rod.

The casing 11 may be preferably provided with baffle plates 53, these being, if desired, cast integrally with the casing, and these baffle plates serve to cause a more thorough circulation of the oil around the various parts of the actuating gearing.

While I have shown and described one embodiment of the invention it will be understood that this has been chosen for purposes of illustration only, and that I do not desire to be limited to the details of construction shown and described, for obvious modifications will occur to a person skilled in the art.

Having thus fully described my invention, what I claim as new and desire to secure by Letters Patent, is:—

1. In mechanism of the character described, the combination, with actuating gearing and a shaft supporting said gearing, of an oil casing around said actuating devices, and having alined bearing apertures on opposite sides thereof, detachable slip bearings for the ends of said shaft, comprising flanges constructed to be fastened to the outside of said casing and cylindrical bearing portions integral with said flanges and insertible through said alined apertures and adapted to conduct oil to said shafts.

2. In mechanism of the character described, the combination, with actuating devices including a driven gear, and a shaft on which said gear is carried, of a casing surrounding and supporting said shaft and gear and having alined bearing apertures therein, detachable slip bearings for said shaft, comprising integrally end flanges adapted to be fastened to said casing over said apertures, and cylindrical bearing portions passing through said alined apertures and supporting the ends of said shaft, said casing having an aperture normally covered by a hood, whereby said gear may be removed from said casing.

In testimony whereof, I affix my signature.

PHILIP A. MYERS.